(12) United States Patent
Kim et al.

(10) Patent No.: US 7,446,819 B2
(45) Date of Patent: Nov. 4, 2008

(54) APPARATUS AND METHOD FOR PROCESSING VIDEO SIGNALS

(75) Inventors: Eung Tae Kim, Gyeonggi-do (KR); Jin Seok Im, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 637 days.

(21) Appl. No.: 10/966,115

(22) Filed: Oct. 15, 2004

(65) Prior Publication Data
US 2005/0111549 A1    May 26, 2005

(30) Foreign Application Priority Data
Oct. 20, 2003    (KR) .................... 10-2003-0073055

(51) Int. Cl.
*H04N 5/44* (2006.01)
(52) U.S. Cl. .................. 348/559; 348/553; 348/620
(58) Field of Classification Search ............ 348/559, 348/553, 560, 571, 607, 618, 620, 725, 726, 348/699; 375/240.12, 240.18, 240.03, 240.16, 375/240.2; *H04N 5/44, 5/14, 5/21*
See application file for complete search history.

(56) References Cited

U.S. PATENT DOCUMENTS

| 5,585,850 | A  | * | 12/1996 | Schwaller ............ 375/240.01 |
| 7,081,874 | B2 | * | 7/2006  | Rivera-Cintron et al. ...... 345/87 |
| 7,106,798 | B1 | * | 9/2006  | Fries et al. ............ 375/240.15 |

\* cited by examiner

*Primary Examiner*—Sherrie Hsia
(74) *Attorney, Agent, or Firm*—Lee. Hong, Degerman, Kang & Schmadeka (57) ABSTRACT

An apparatus and method for processing video signals, which can selectively freeze any one of two or more images being displayed, are disclosed. The apparatus includes a video decoder decoding at least one video stream in picture units, by using a plurality of decoding frames and at least one freezing frame, a memory storing in picture units the decoded video stream outputted from the video decoder, and a plurality of video processors reading the stored video stream from the memory and transforming the stored video stream to displayable data.

16 Claims, 11 Drawing Sheets

Main/VCR type display
DTV main : Freeze
DTV VCR : Moving

FIG. 3B

Main/VCR type display
DTV main : Moving
DTV VCR : Freeze

FIG. 4A

Main/VCR type display
DTV0 main : Freeze
DTV1 VCR : Moving

FIG. 4B

Main/VCR type display
DTV0 main : Moving
DTV1 VCR : Freeze

FIG. 5A

PIP type display
DTV main : Freeze/Moving
DTV VCR : Moving/Freeze

FIG. 5B

Split-screen type display
DTV main : Freeze/Moving
DTV VCR : Moving/Freeze

APPARATUS AND METHOD FOR PROCESSING VIDEO SIGNALS

CROSS-REFERENCE TO RELATED APPLICATIONS

This application claims the benefit of Korean Application No. P2003-073055, filed on Oct. 20, 2003, which is hereby incorporated by reference as if fully set forth herein.

BACKGROUND OF THE INVENTION

1. Field of the Invention

The present invention relates to a display device, and more particularly, to an apparatus and method for processing video signals that can selectively freeze one of two or more video images being displayed.

2. Discussion of the Related Art

Recently, digital televisions have been developed to be able to display two or more video signals. For example, by using a picture-in-picture (PIP) mode or a split-screen mode, the digital television can simultaneously display more than one broadcast channel, or simultaneously display one broadcast channel and one external signal on the screen. In addition, the digital television also has a picture freeze function that can temporarily freeze the picture that is being displayed. The picture freeze function is realized (or performed) from a video decoder inside the digital television.

The picture freeze function can be realized when the video decoder fails to decode a bit stream being received in order to freeze the picture. Alternatively, the screen freeze function can also be realized when the video decoder continues to decode the bit stream being received and a video processor displays a frame, which is stored in the frame, onto a screen. In case of the first method, the decoding of the bit stream cannot be easily performed when reproducing the image in a later process. This is because a sequence header or a group of picture (GOP) header subsequent to the bit stream cannot be easily found. In addition, when the video decoder is not operated, neither one of the main picture and the sub-picture can be displayed. On the other hand, in case of the second method, the sub-picture can be displayed even when the main picture is on freeze mode. However, in this case, the video processor should include a separate memory area. Accordingly, an additional bandwidth is also required.

SUMMARY OF THE INVENTION

Accordingly, the present invention is directed to an apparatus and method for processing video signals that substantially obviate one or more problems due to limitations and disadvantages of the related art.

An object of the present invention is to provide an apparatus and method for processing video signals that can selectively freeze any one of two or more images being displayed, when displaying two or more images.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an apparatus for processing video signals includes a video decoder decoding at least one video stream in picture units, by using a plurality of decoding frames and at least one freezing frame, a memory storing in picture units the at least one decoded video stream outputted from the video decoder, and a plurality of video processors reading the at least one stored video stream from the memory and transforming the at least one video stream to displayable data.

The video decomposer may include a variable length decoder extracting motion vectors, a quantization value, and a discrete cosine transform coefficient from the video stream, an inverse quantizing unit inverse quantizing the video stream based on the extracted quantizing value, an inverse transforming unit transforming the inverse quantized video stream based on the extracted discrete cosine transform coefficient, a motion compensator compensating motion of the video stream based on the extracted motion vectors, and an adder synthesizing data outputted from the inverse transforming unit and data outputted from the motion compensator.

The video decoder may also include a memory interface transmitting a signal outputted from the adder to the memory, and transmitting the data stored in the memory to the motion compensator. And, the memory interface may include a down-sampler down-sampling data outputted from the adder, and transmitting the down-sampled data to the memory, and an up-sampler up-sampling the data stored in the memory, and transmitting the up-sampled data to the motion compensator.

The apparatus for processing video signals according to the present invention may also include a parameter controller receiving parameter information outputted from the video decoder, and transmitting the received parameter information to the video processors. Herein, the parameter information may include any one of information on decoded frames, information on field, information on display size, and progressive information.

In another aspect of the present invention, a method for processing video signals includes decoding at least one video stream in picture units in accordance with a repeated frame cycle, wherein the frame cycle includes a plurality of decoding frame periods and a freezing frame period, storing pictures corresponding to the decoding frame periods and a picture corresponding to the freezing frame period in a memory, and transforming each of the pictures corresponding to the decoding frame periods and the picture corresponding to the freezing frame period into displayable data.

The decoding at least one video stream in picture units may include decoding the at least one video stream in accordance with the decoding video frames, when a freeze enable signal is received. Also, the decoding at least one video stream in picture units may include extracting motion vectors, a quantization value, and a discrete cosine transform coefficient from the video stream. Furthermore, the decoding at least one video stream in picture units may also include inverse quantizing the video stream based on the extracted quantizing value, transforming the inverse quantized video stream based on the extracted discrete cosine transform coefficient, and compensating motion of the video stream based on the extracted motion vectors.

The decoding at least one video stream in picture units may include decoding a video stream selected for picture freezing in accordance with the freezing frame period, and decoding a non-selected video stream in accordance with the decoding frame periods and the freezing frame period. And, the transforming each of the pictures into displayable data may include transforming the stored pictures to displayable data based on the parameter information extracted from the decoded video stream and the stored pictures.

In a further aspect of the present invention, an apparatus for processing video signals includes a video decoder decoding at least one video stream in picture units in accordance with a repeated frame cycle, wherein the frame cycle includes a plurality of decoding frame periods and a freezing frame period, a memory storing pictures corresponding to the decoding frame periods and a picture corresponding to the freezing frame period in a memory, and a first video processor and a second video processor transforming each of the pictures corresponding to the decoding frame periods and the picture corresponding to the freezing frame period into displayable data.

Herein, the video decoder may decode the at least one video stream in accordance with the decoding video frames, when a freeze enable signal is received. And, the video decoder may also decode the video stream designated by the freezing enable signal in accordance with the freezing frame period, when the freeze enable signal is received, and decoding non-designated video streams in accordance with the decoding frame periods.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
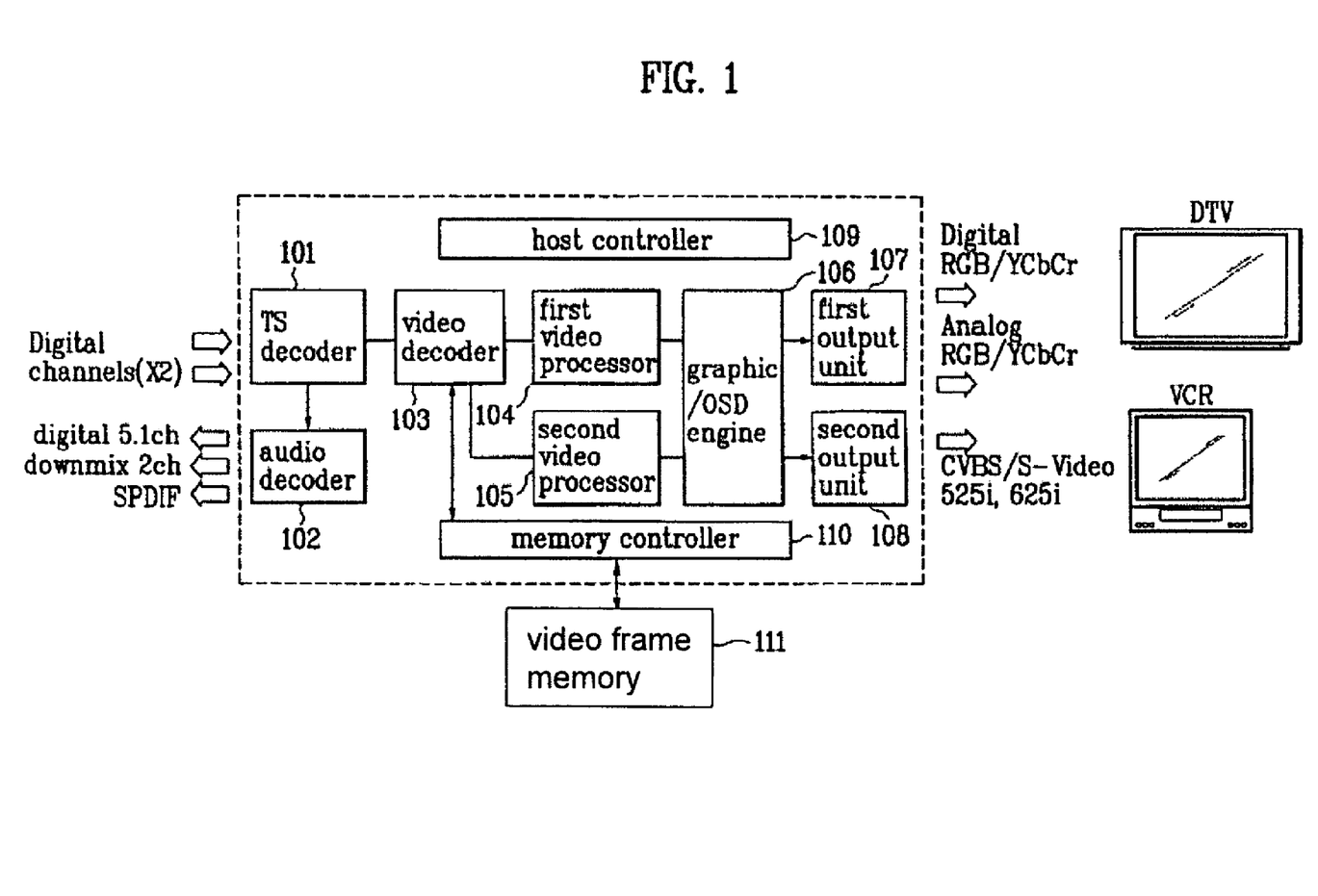
FIG. 1 illustrates a block diagram of a structure of an apparatus for processing video signals according to the present invention.

FIG. 1 illustrates a block diagram of a structure of an apparatus for processing video signals according to the present invention. Referring to FIG. 1, a TS decoder 101 receives at least one compressed bit stream, and divides the received bit stream to a video signal, an audio signal, and a supplementary information. The bit streams being received by the TS decoder 101 include either streams being received through at least one digital broadcast channel, or streams being provided from external devices such as DVD, personal video recorders (PVRs), and camcorders. For example, when the TS decoder 101 receives two compressed bit streams, the TS decoder 101 decodes the two bit streams by using a time-division method, and the two bits streams are divided into two video packetized elementary streams (PESs) and two audio PESs.

An audio decoder 102 decodes the audio signal being transmitted from the TS decoder 101 and provides the decoded audio signal to a speaker (not shown). A video decoder 103 decodes the video signal transmitted from the TS decoder 101. When the video decoder 103 receives two types of video signals, the video decoder 103 transmits one of the video signals to a first video processor 104 and transmits the other one of the video signals to a second video processor 105. For example, the video decoder 103 transmits the video signal corresponding to the main picture to the first video processor 104 and transmits the video signal corresponding to the sub-picture to the second video processor 105. Subsequently, each of the first and second video processors 104 and 105 transforms the received video signal into displayable video data. The first video processor 104 processes the video signal corresponding to the main picture. And, the second video processor 105 processes the video signal corresponding to the sub-picture, such as a PIP, or the video signal that is to be provided to a video cassette recorder (VCR).

A graphic/OSD engine 106 receives the video data transmitted from the first and second video processors 104 and 105. Thereafter, in order to superimpose a graphic or an on screen display (OSD) on a screen to be displayed, the graphic/OSD engine 106 either adds required data to the video data, or modifies (or transforms) the received video data. A first output unit 107 receives the video data outputted from the first video processor 104 through the graphic/OSD engine 106 and, then, transmits the received video data to the display of the television receiver. The video data being outputted from the first output unit 107 is displayed either on the entire screen of the television receiver or on the main picture. A second output unit 108 receives the video data output from the second video processor 105 through the graphic/OSD engine 106.

The video data being outputted from the second video processor 108 is either displayed on the sub-picture of the television receiver or provided to the VCR.

A memory 111 for storing the video signals receives the video signals outputted from the video decoder 103 through a memory controller 110. The memory controller 110 controls video signal exchange between the memory 111 and the video decoder 103. In addition, a host controller 109 controls a flow of a series of video signals in accordance with a control of a CPU (not shown).

Figure 2:
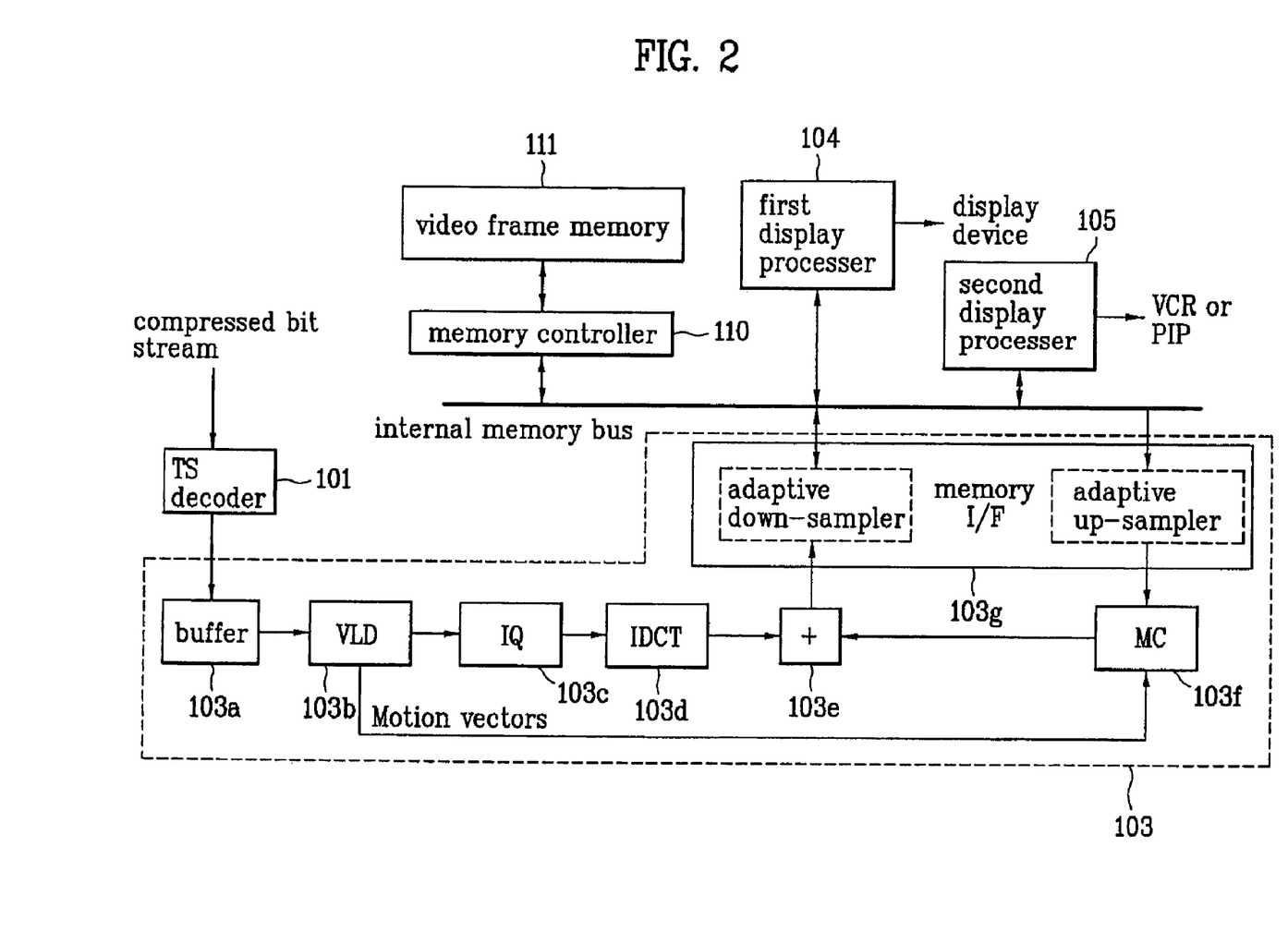
FIG. 2 illustrates a more detailed block diagram of a video decoder in FIG. 1.

FIG. 2 illustrates a more detailed block diagram of a video decoder in FIG. 1. Referring to FIG. 2, a buffer 103a receives the video signal from the TS decoder 103 and, then, transmits the received video signal to a variable length decoder (VLD) 103b. The video signal being transmitted from the TS decoder 103 to the buffer 103a has the format of a packetized elementary stream (PES). The VLD 103b extracts motion vectors, a quantization value, a discrete cosine transform (DCT) coefficient, and so on, from the video signals. Thereafter, the VLD 103b transmits the extracted motion vectors to a motion compensator 103f and transmits the quantization value and the DCT coefficient along with the video signal to an inverse quantizing (IQ) part 103c. The IQ part 103c inverse quantizes the quatization value based on the video signal. The IQ part 103c then transmits the inverse quatized video signal to an inverse discrete cosine transform (IDCT) part 103d. The IDCT part 103d performs an inverse discrete cosine transform of the video signal based on the DCT coefficient. The IDCT part 103d transforms the video signal to a 8×8 block unit so as to fit an MPEG-2 video syntax.

A motion compensator 103f compensates the motion of up-sampled data based on the motion vectors. An adder 103e receives the data outputted from the IDCT part 103d and the data outputted from the motion compensator 103f. When the video signal inputted to the IDCT part 103d is an intra-picture (I-picture), the adder 103e outputs only the data from the IDCT part 103d, more specifically, only the inverse quantized and inverse discrete cosine transformed video signal. When the video signal inputted to the IDCT part 103d is a predictive-picture (P-picture) or a bi-directional-picture (B-picture), the adder 103e synthesizes the data outputted from the IDCT part 103d and the data outputted from the motion compensator 103f and, then, outputs the synthesized data.

Furthermore, a memory interface 103g includes an adaptive down-sampler and an adaptive up-sampler in order to output high picture quality and, simultaneously, reduce a storing capacity of the video data. The adaptive down-sampler and the adaptive up-sampler reduce the size of the video data to be stored in the memory 111 to ½ or ¼. And, in order to maintain high picture quality, the adaptive down-sampler and the adaptive up-sampler minimize a drift error that may occur during a decoding of an MPEG video data. The adaptive down-sampler receives the data outputted from the adder 103e and down-samples the received data. The adaptive up-sampler up-samples the data down-sampled from the adaptive down-sampler and, then, transmits the up-sampled data to the motion compensator 103f. The adaptive down-sampler and the adaptive up-sampler are included in a single memory interface 103g.

In the apparatus for processing video signals according to the present invention, a DTV channel program can be simultaneously displayed on a main picture and a sub-picture. Alternatively, two or more DTV channel programs can also be independently displayed on each of the main picture and the sub-picture. In the present invention, a picture freeze mode may be performed in each of the above-described cases, which will now be described in more detail with reference to the accompanying drawings.

Figure 3A:
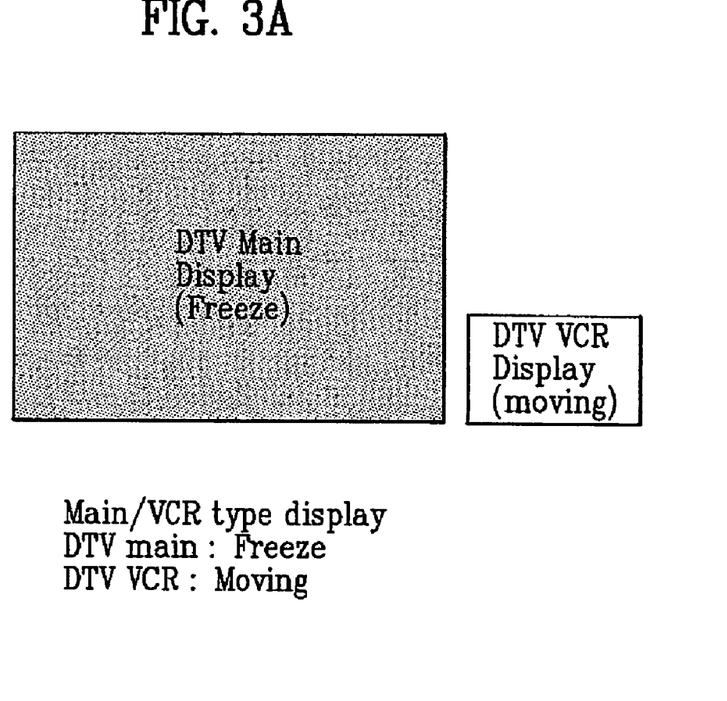
FIG. 3A illustrates an example of only a picture of a digital television being on freeze mode, when a digital television channel is simultaneously displayed on the digital television and a VCR.
Figure 3B:
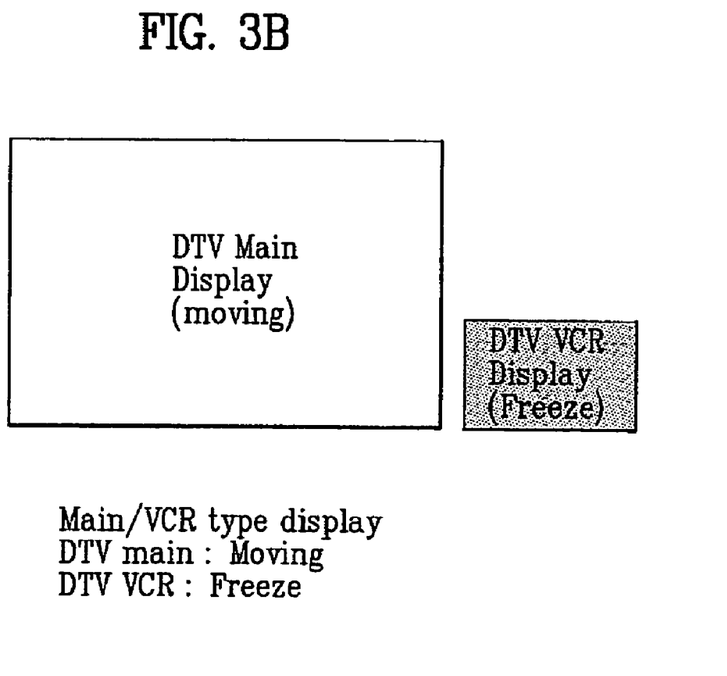
FIG. 3B illustrates an example of only a picture of a VCR being on freeze mode, when a digital television channel is simultaneously displayed on the digital television and the VCR.
Figure 4A:
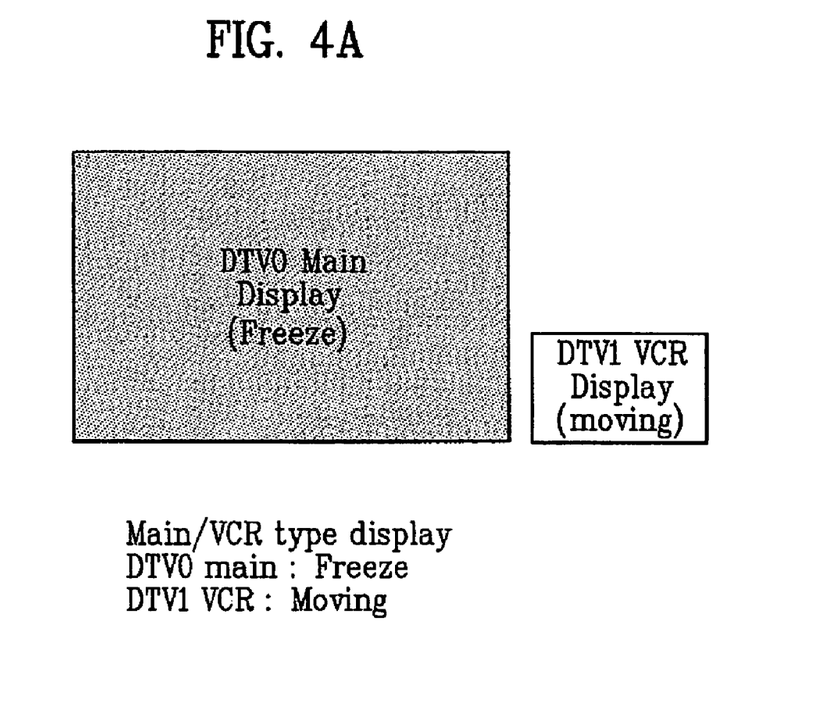
FIG. 4A illustrates an example of only a picture of the digital television being on freeze mode, when two different channels are displayed on each of the digital television and the VCR.
Figure 4B:
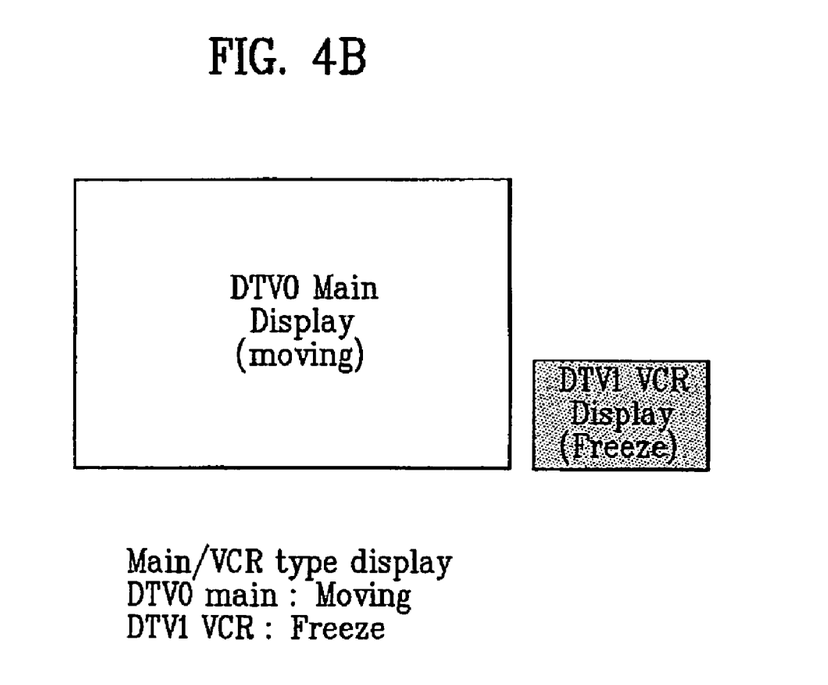
FIG. 4B illustrates an example of only a picture of the VCR being on freeze mode, when two different channels are displayed on each of the digital television and the VCR.

FIG. 3A illustrates an example of only a picture of a digital television being on freeze mode, when a digital television channel is simultaneously displayed on the digital television and a VCR. At this point, the digital television channel is continuously reproduced on the VCR. Also, FIG. 3B illustrates an example of only a picture of a VCR being on freeze mode, when a digital television channel is simultaneously displayed on the digital television and the VCR. On the other hand, FIG. 4A illustrates an example of only a picture of the digital television being on freeze mode, when two different channels are displayed on each of the digital television and the VCR. And, FIG. 4B illustrates an example of only a picture of the VCR being on freeze mode, when two different channels are displayed on each of the digital television and the VCR.

Figure 5A:
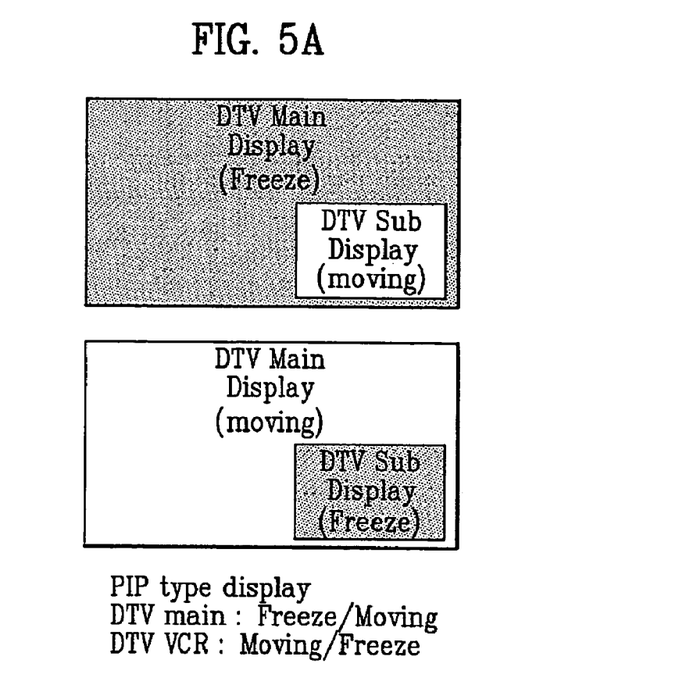
FIGS. 5A and 5B illustrate examples of at least one of a main picture and a sub-picture selectively being on freeze mode, when at least one television channel is being displayed on the main picture and the sub-picture.
Figure 5B:
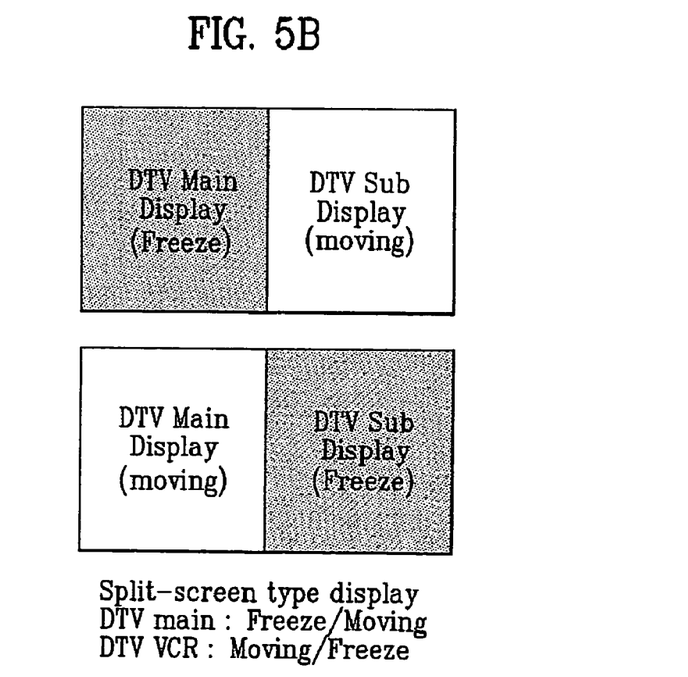

FIGS. 5A and 5B illustrate examples of at least one of a main picture and a sub-picture selectively being on freeze mode, when at least one television channel is being displayed on the main picture and the sub-picture. Herein, the sub-picture shown in FIG. 5A is a PIP, and the sub-picture shown in FIG. 5B is a divided picture. The display type shown in FIGS. 5A and 5B may reduce the used capacity of the memory. In case of the PIP, a ¼ compression can be applied in order to reduce the resolution by ½ horizontally and by ½ perpendicularly, thereby reducing the memory capacity. Alternatively, in case of the divided (or split-screen) picture, when displaying a video image by dividing (or splitting) the entire screen (or picture) in two, each of the two video frames is horizontally compressed by ½ so as to be displayed, thereby reducing the memory capacity and the bandwidth.

As described above, in order to perform the picture freeze mode in various display types, the video decoder 103 controls the various display information (e.g., display frame, display size, video header information, etc.) provided to each of the video processors 104 and 105, thereby enabling a video picture freeze mode and a continuous picture reproduction after the picture freeze mode to be performed.

Figure 6:
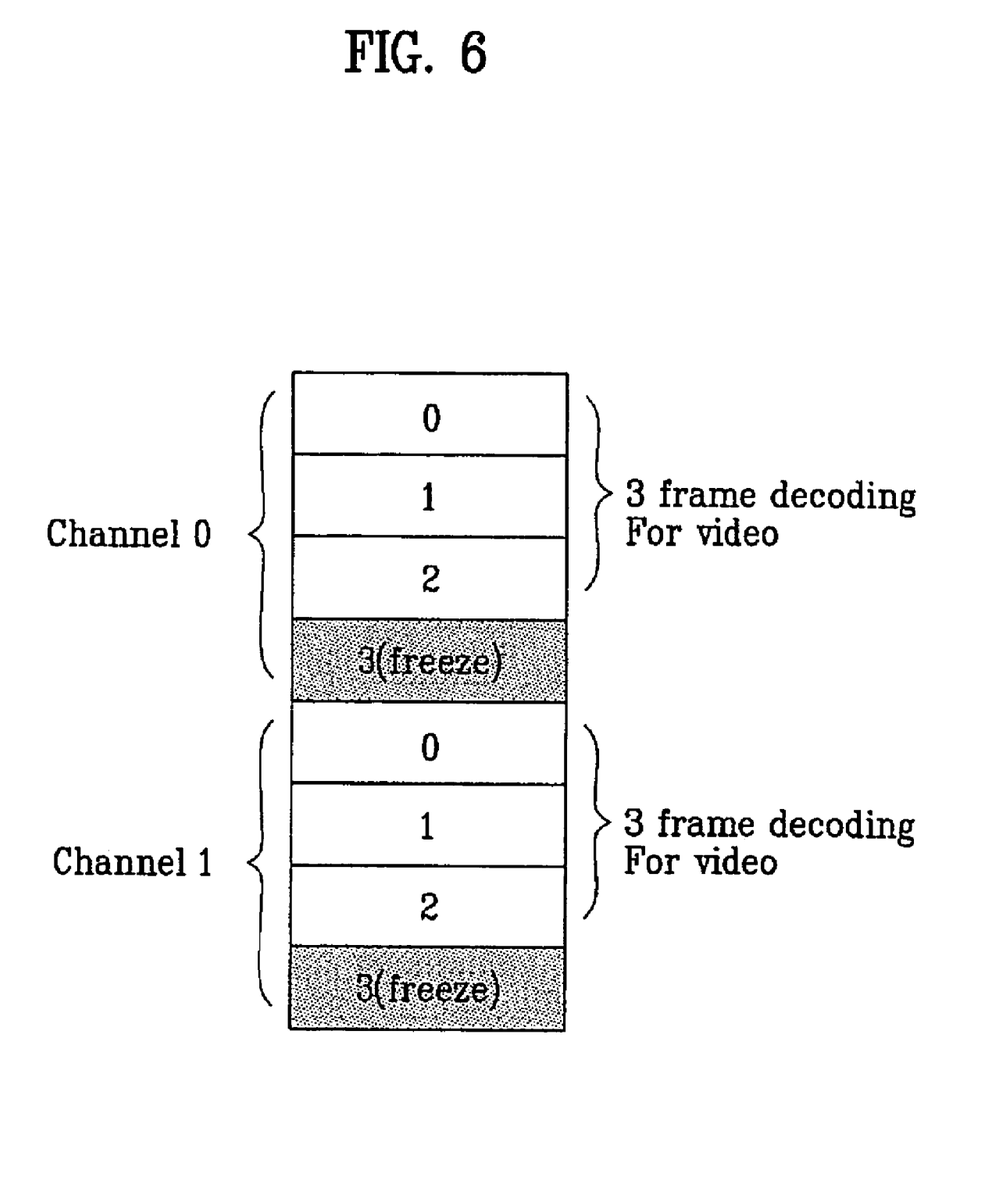
FIG. 6 illustrates a map of a video frame memory in FIG. 1.

Additionally, in order to perform the picture freeze mode, the video decoder 103 modifies a map of the video frame memory 111, as shown in FIG. 6. More specifically, referring to FIG. 6, a frame for the picture freeze mode is added to the three frames conventionally used for video decoding. When operated normally, the video decoder 103 uses four frames for video decoding. When the picture freeze mode is activated, the video decoder 103 uses only three frames for video decoding and uses the remaining one frame for picture freezing. Any one of the four frames may be used for the picture freezing, regardless of a picture coding type of the frame. As shown in FIG. 6, the number of the frame for picture freezing is Number 3. When the picture freeze frame number is fixed to Number 3, the video decoder 103 provides the freeze image to the video processor always through frame Number 3 in order to freeze the picture.

Figure 7:
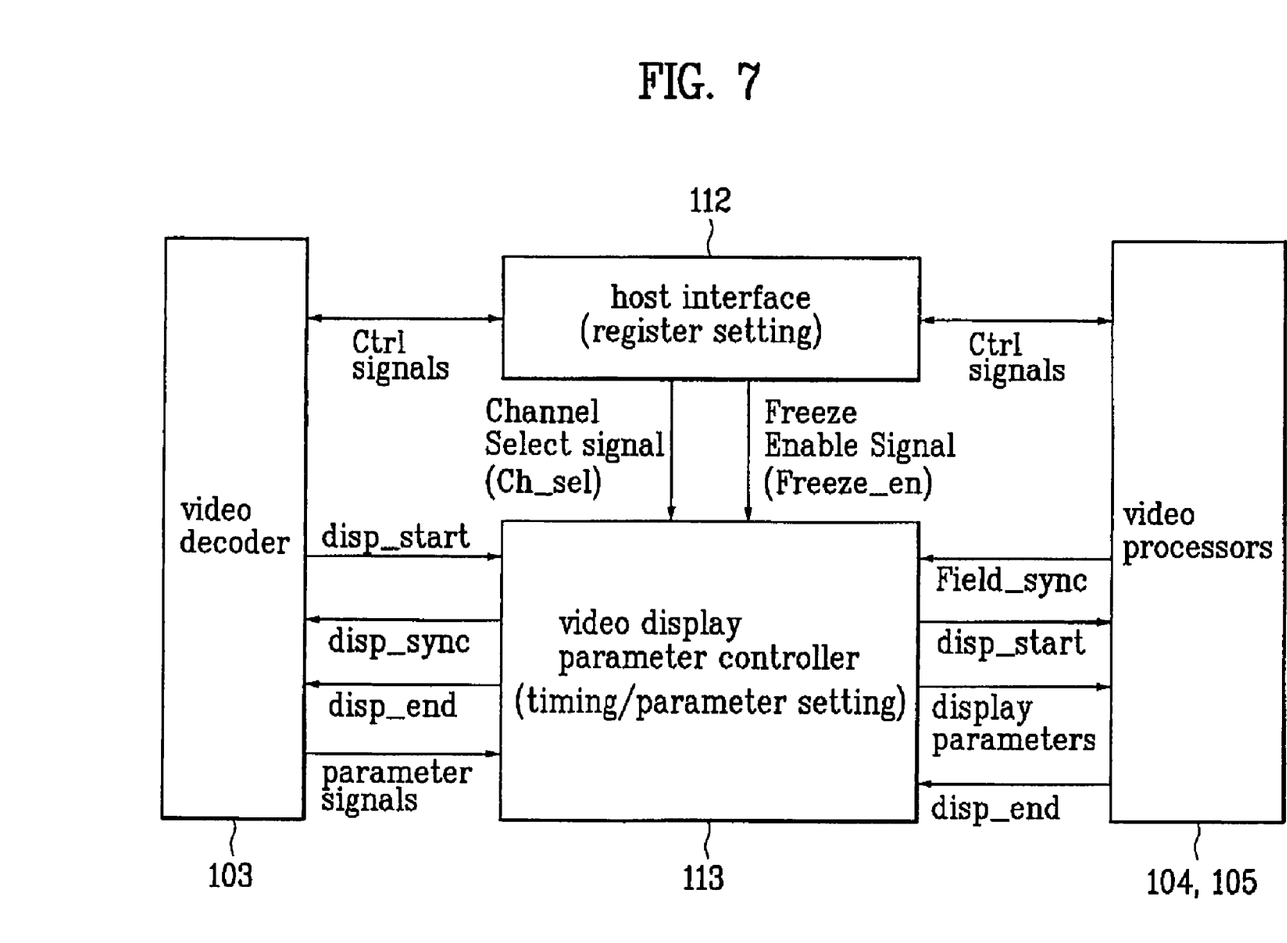
FIG. 7 illustrates an interface device for controlling parameter information.

FIG. 7 illustrates an interface device for controlling various information, which are provided from the video decoder 103 to the video processors 104 and 105. Referring to FIG. 7, the video decoder 103 transmits a user-selected channel, such as a channel select signal (Ch-sel) for distinguishing a specific channel selected by the user for the picture freezing mode and a picture freeze enable signal (freeze_en), to a video display parameter controller (VDPC) 113 through a host interface 112. The parameter controller 113 receives the various parameter information decoded from the video decoder 103 and, then, transmits the decoded parameter information to the video processors 104 and 105. At this point, the parameter controller 113 synchronizes the information with the field_sync and transmits the information to the video processors 104 and 105 accordingly. Based on the received information, the video processors 104 and 105 control the video frame displayed on the screen. The information being provided from the video decoder 103 to the parameter controller 113 include information on the decoded frame (decode_frame), information on the field to be displayed (disp_field), display horizontal size, display vertical size, progressive information, and information notifying display start (disp_start). The information are either read from the memory 111 by the video decoder 103 or extracted from the received video signal.

Figure 8:
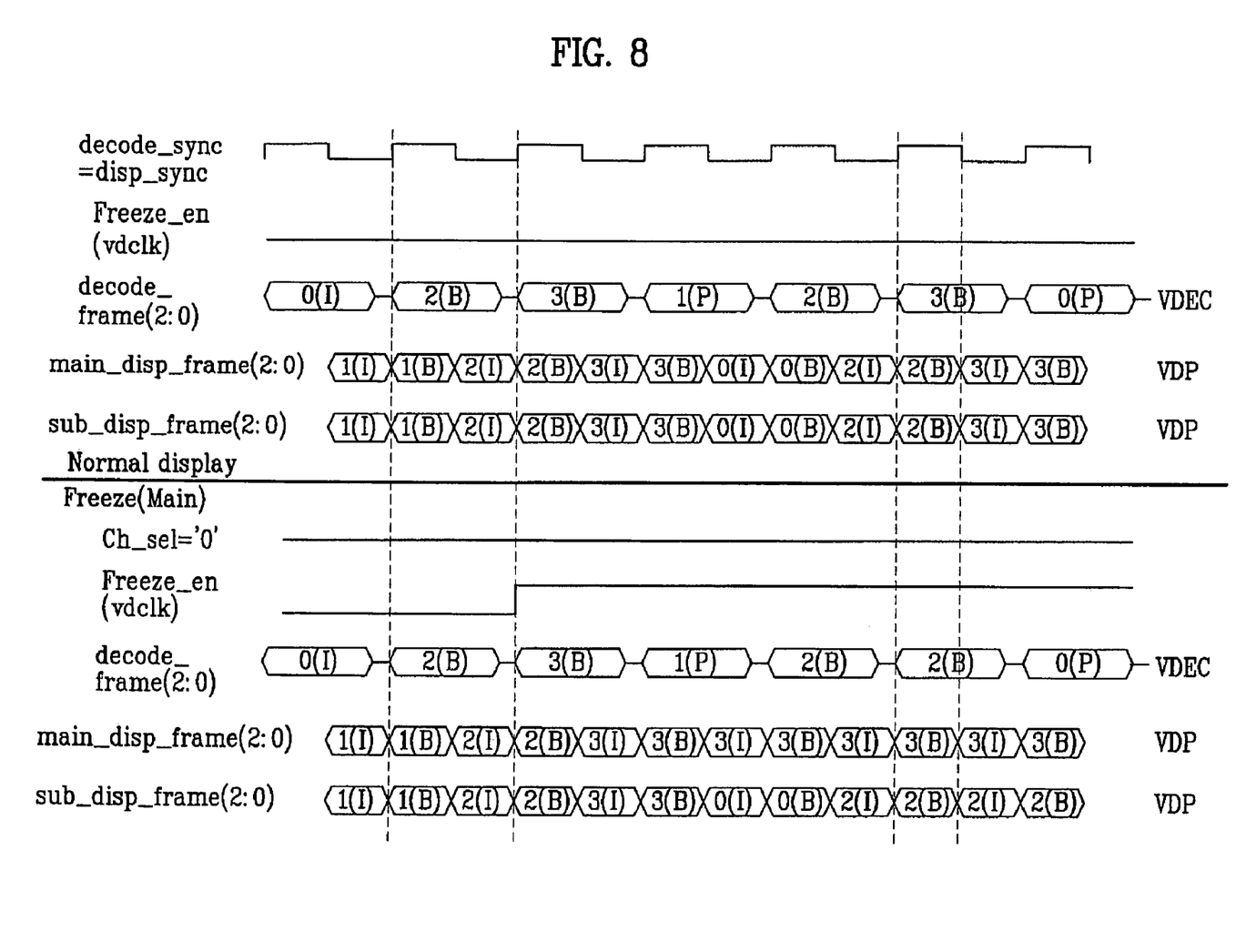
FIG. 8 illustrates a timing sequence of the main picture being on freeze mode, when a DTV channel is being simultaneously outputted on the main picture and the sub-picture.

FIG. 8 illustrates a timing sequence of the main picture being on freeze mode, when a DTV channel is being simultaneously outputted on the main picture and the sub-picture. The video decoder 103 proposed in the present invention is formed to control the received video signals by picture units, so as to decode one video sequence within one frame period. Referring to FIG. 8, the decode_sync of the video decoder 103 represents a necessary period required for decoding one frame. The decode_sync is identical to the display field sync (disp_sync) signal of the video processors 104 and 105. Moreover, a decode_frame (2:0) of FIG. 8 represents a decoded video frame used in the memory, and a disp_frame (2:0) read from the corresponding frame memory area and being displayed. The display frame consists of a top field and a bottom field. The video frame is decoded during a previous frame and is realigned in accordance with a display field (disp_field) signal and displayed. More specifically, referring to FIG. 8, when the video signal is displayed normally by using four frames in a GOP structure of an IBBP, the frame being displayed is delayed by a one-field period as compared to the decoded frame, and an identical frame is displayed on the main picture and the sub-picture.

As shown in FIG. 8, if the freeze enable signal freeze_en corresponding to the main picture is supplied to the parameter controller 113 due to the channel select signal ch_sel='0', when the decode_frame number is '3', the main_disp_frame of the main picture is fixed as frame Number 3, which is used specifically as the picture freeze frame. Accordingly, the video processor 104 reads frame Number 3, which is the number of the decoded frame, from the memory and displays the read frame. In this case, with the exception of the frame having the decode_frame number '3', the video decoder 103 continues the decoding within the frame numbered from '0' to '2'. Then, the sub_disp_frame corresponding to the sub-picture is further transmitted to the video processor 105 in accordance with the decode_frame delayed by one-field period.

At this point, in case of a B-picture, an overlapping region occurs between the frame decoded in accordance with a time delay and the displayed frame. Therefore, the video decoder 103 controls the decoding based on a display slice signal disp_slice, in order to prevent the pictures from becoming mixed. The display slice signal disp_slice is a signal being provided from the video processors 104 and 105 to the video decoder 103. By using the above-described method, the main picture only displays the image corresponding to the third frame, and the sub-picture continues to display image frames being decoded.

Figure 9:
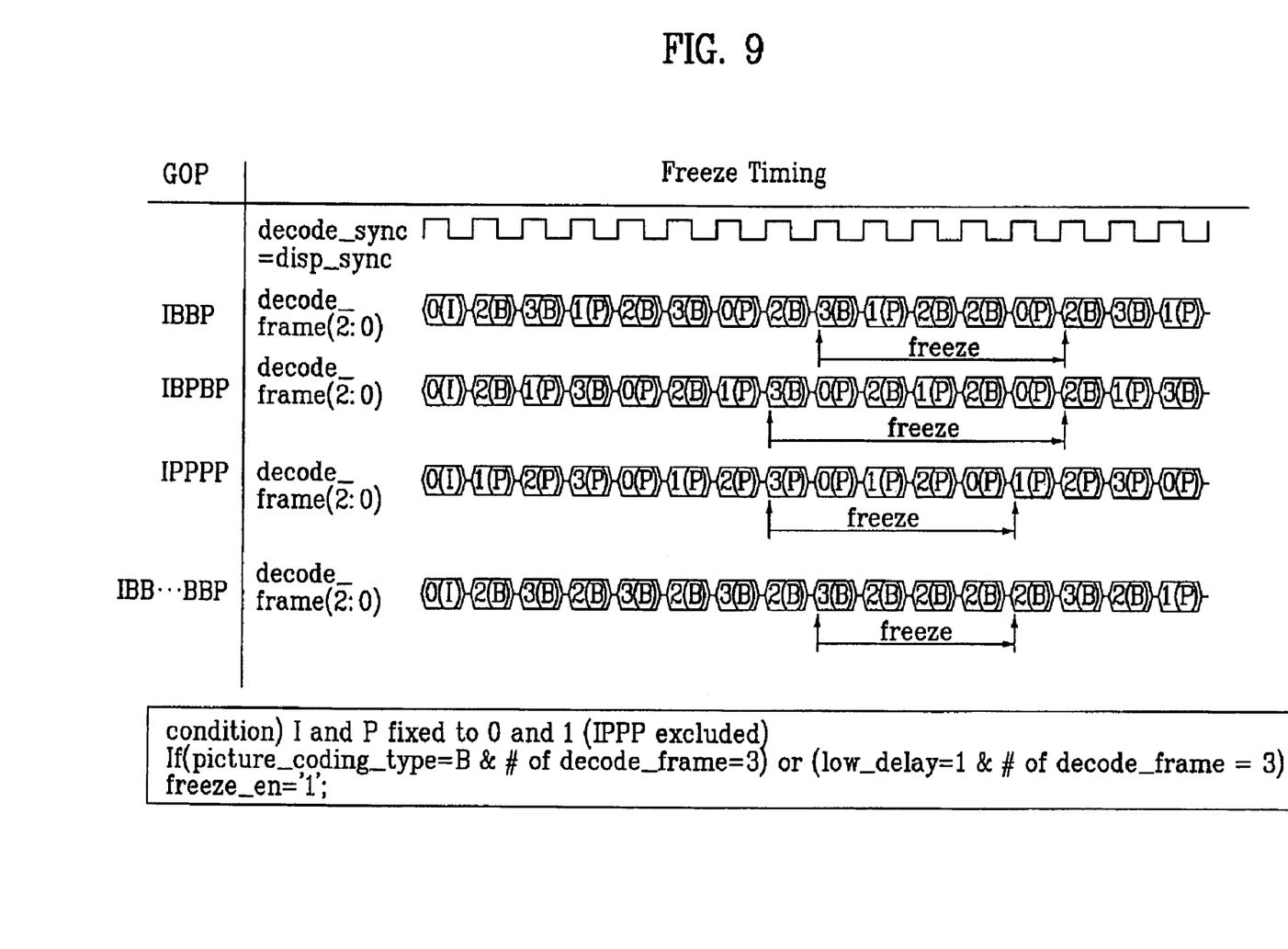
FIG. 9 illustrates a picture freeze timing sequence according to a GOP structure.

FIG. 9 illustrates a picture freeze timing sequence according to a GOP structure. More specifically, in case of a group of pictures (GOP) of IBBP, IBPBP, and IPPP, the decoded frames are displayed when the freeze enable signal freeze_en is supplied to the parameter controller 113. The predetermined condition is to use the third frame as the picture freeze frame and to limit the decoding frames corresponding to an I-picture and a P-picture to '0' and '1'. However, as an exception, in the video sequence having the GOP structure of IPPP, which is a low_delay signal, the I-picture and the P-picture may have a random frame number. Under such conditions, it can be shown that the supplying point of the freeze enable signal freeze_en is supplied when the frame is a B-picture frame and when the number of the decoding frame is '3'. In addition, in case of a video sequence (IPPP), which is a low_delay signal, a picture freeze is performed when the frame is a P-picture frame and when the number of the decoding frame is '3'. The Number 3 frame does not exist in the picture freeze section, which starts in accordance with the freeze enable signal freeze_en. More specifically, since the Number 3 frame is used for the picture freeze, during the picture freeze section, the video signal is decoded by using the remaining three frames corresponding to the numbers '0' to '2'. When the freeze enable signal freeze_en is not applied, the video decoder 103 may use any one of the frames corresponding to the numbers '0' to '3'.

Figure 10:
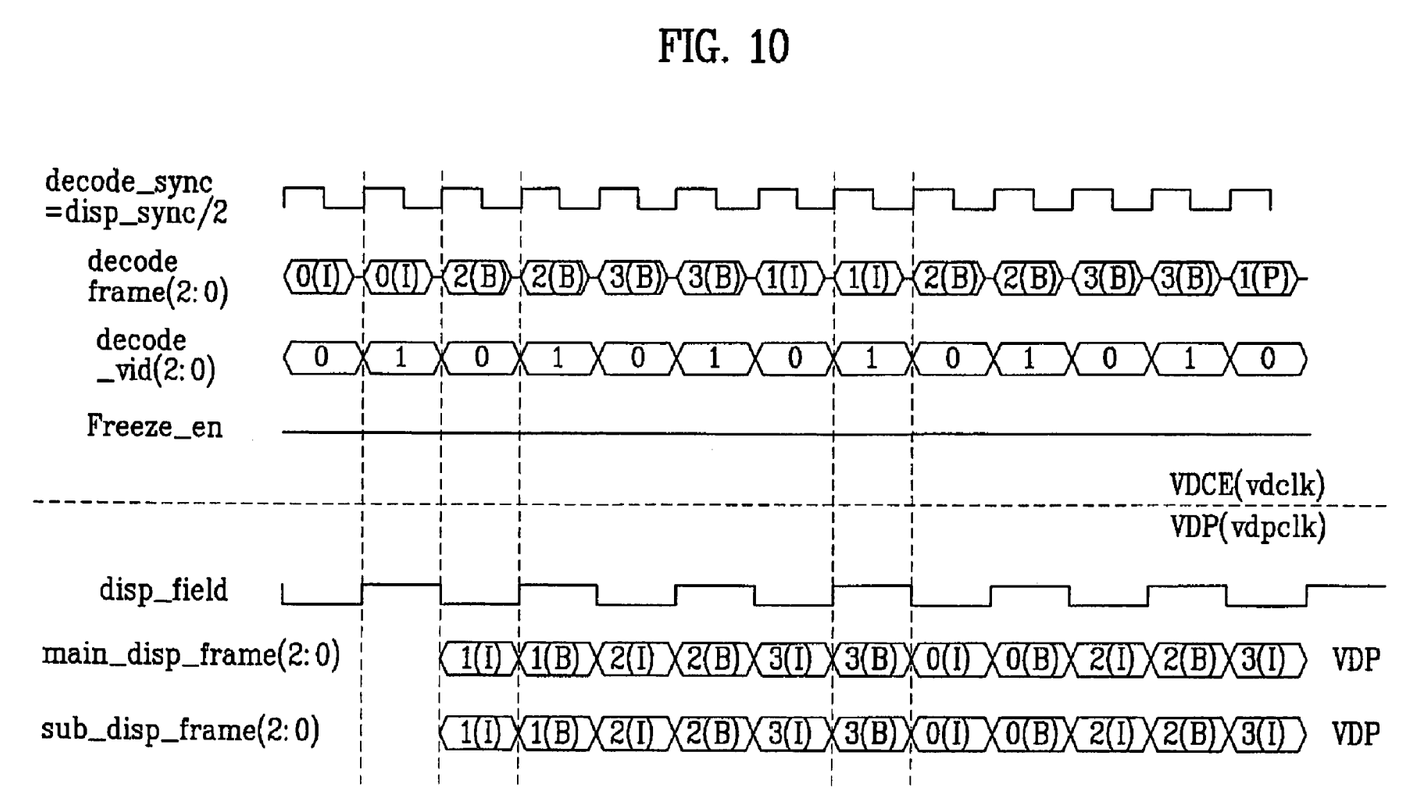
FIG. 10 illustrates a timing sequence of an example of two television channels being displayed on the main picture and the sub-picture, respectively.

FIG. 10 illustrates a timing sequence of an example of two television channels being displayed on the main picture and the sub-picture, respectively. Referring to FIG. 10, a cycle of the decode_sync is identical to half the cycle of the display field sync signal disp_sync of the video processors 104 and 105. As shown in FIG. 8, the video decoder 103 decodes one video frame during a one-frame period of the decode_sync. However, in FIG. 10, the video decoder 103 decodes two video frames during one frame period.

A decode_vid(0:2), which is a video ID for distinguishing the decoded video signals of various channels, is outputted from the video decoder 103. The plurality of video signals are distinguished based on the decode_vid. Herein, the decode_vid consists of '0' and '1'. In addition, since the video decoder 103 transmits disp_frame information corresponding to each of the main picture and the sub-picture to the video processors 104 and 105, the two pictures are displayed in accordance with the one-frame period. At this point, the two frames are respectively displayed in the top field and the bottom field.

Figure 11:
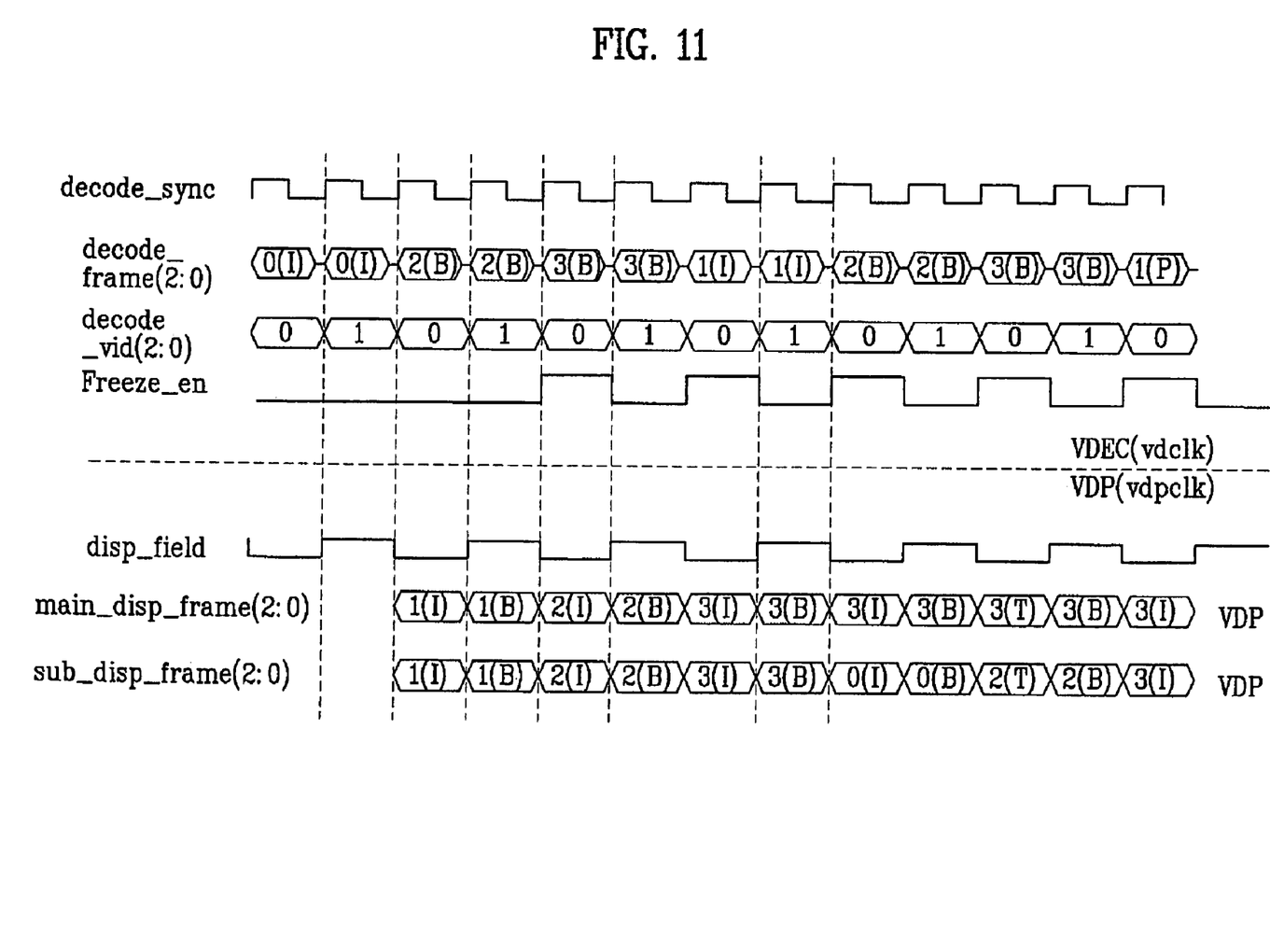
FIG. 11 illustrates a timing sequence of a corresponding freeze enable signal being applied to the main picture, when two DTV channels are being displayed on the main picture and the sub-picture, respectively.

FIG. 11 illustrates a timing sequence of a corresponding freeze enable signal being applied to the main picture, when two DTV channels are being displayed on the main picture and the sub-picture, respectively. Referring to FIG. 11, the freeze_en signal is synchronized with the decode_vid='0' signal. As the freeze_en signal is supplied, the main picture main_disp_frame is fixed to the Number 3 frame, and the decoding of the frames from Numbers '0' to '2' corresponding to the main picture (DTV0) is continued. Meanwhile, the video signals corresponding to the sub-picture are decoded by using the frames from Numbers '0' to '3'. Conversely, when the main picture (DTV0) is decoded normally and the sub-picture (DTV1) is on freeze mode, the freeze-en signal is supplied when the decode_vid is equal to '1', and the decoding of the sub-picture (DTV1) corresponding to the frames from Numbers '0' to '2' is continued.

The apparatus and method for processing video signals according to the present invention has the following advantages. While one or more MPEG-2 video sequences are being decoded, a main picture and a sub-picture can be selectively put to a picture freeze mode. Furthermore, since an additional frame for the freeze mode is added to a memory map, the used capacity of the memory can be reduced.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. An apparatus for processing video signals, comprising:
   a video decoder decoding at least one video stream in picture units, by using a plurality of decoding frames and at least one freezing frame;
   a memory storing in picture units the decoded video stream output from the video decoder, wherein the memory comprises a first area for storing pictures corresponding to the plurality of decoding frames, and a second area for storing pictures corresponding to the at least one freezing frame; and
   a plurality of video processors reading in picture units the stored video stream from the memory and transforming the read video stream to displayable data, wherein a video processor selected by a selection signal reads a picture corresponding to the at least one freezing frame from the memory, and a non-selected video processor reads pictures corresponding to the plurality of decoding frames from the memory.

2. The apparatus of claim 1, wherein the video decoder comprises:
   a variable length decoder extracting motion vectors, a quantization value, and a discrete cosine transform coefficient from the video stream;
   an inverse quantizing unit inverse-quantizing the video stream based on the extracted quantizing value;
   an inverse transforming unit transforming the inverse-quantized video stream based on the extracted discrete cosine transform coefficient;
   a motion compensator compensating motion of the video stream based on the extracted motion vectors; and
   an adder synthesizing data outputted from the inverse transforming unit and data outputted from the motion compensator.

3. The apparatus of claim 2, wherein the video decoder further comprises a memory interface transmitting a signal outputted from the adder to the memory, and transmitting the data stored in the memory to the motion compensator.

4. The apparatus of claim 3, wherein the memory interface comprises:
   a down-sampler down-sampling data outputted from the adder, and transmitting the down-sampled data to the memory; and
   an up-sampler up-sampling the data stored in the memory, and transmitting the up-sampled data to the motion compensator.

5. The apparatus of claim 2, wherein the adder outputs only the data outputted from the inverse transforming unit, when the video stream is an intra-picture.

6. The apparatus of claim 1, further comprising a parameter controller receiving parameter information outputted from the video decoder, and transmitting the received parameter information to the video processors.

7. The apparatus of claim 6, wherein the parameter information include any one of information on decoded frames, information on field, information on display size, and progressive information.

8. A method for processing video signals, comprising:
   a plurality of decoding frame periods and a freezing frame period;
   decoding a video stream selected for picture freezing in accordance with the freezing frame period and decoding a non-selected video stream in accordance with the plurality of decoding frame periods and the freezing frame period;
   storing pictures corresponding to the plurality of decoding frame periods and a picture corresponding to the freezing frame period in a memory; and
   transforming each of the pictures corresponding to the plurality of decoding frame periods and the picture corresponding to the freezing frame period into displayable data.

9. The method of claim 8, wherein the decoding at least one video stream in picture units comprises decoding the at least one video stream in accordance with the decoding video frames, when a freeze enable signal is received.

10. The method of claim 8, wherein the decoding at least one video stream in picture units comprises extracting motion vectors, a quantization value, and a discrete cosine transform coefficient from the video stream.

11. The method of claim 10, wherein the decoding at least one video stream in picture units further comprises:
    inverse-quantizing the video stream based on the extracted quantizing value;
    transforming the inverse-quantized video stream based on the extracted discrete cosine transform coefficient; and
    compensating motion of the video stream based on the extracted motion vectors.

12. The method of claim 8, wherein the decoding at least one video stream in picture units comprises decoding each of the video stream representing a main picture and the video stream representing a sub-picture in accordance with the decoding frame periods and the freezing frame period, respectively.

13. The method of claim 8, wherein the transforming each of the pictures into displayable data comprises transforming the stored pictures to displayable data based on parameter information extracted from the decoded video stream and the stored pictures.

14. The method of claim 13, wherein the parameter information include any one of information on decoded frames, information on field, information on display size, and progressive information.

15. An apparatus for processing video signals, comprising:
    a video decoder including a plurality of decoding frame periods and a freezing frame period, wherein the video decoder decodes a video stream designated by a freeze enable signal in accordance with the freezing frame period, when the freeze enable signal is received, and decodes non-designated video streams in accordance with the plurality of decoding frame periods;
    a memory storing pictures corresponding to the plurality of decoding frame periods and a picture corresponding to the freezing frame period in a memory; and
    a first video processor and a second video processor transforming each of the pictures corresponding to the plurality of decoding frame periods and the picture corresponding to the freezing frame period into displayable data.

16. The apparatus of claim 15, wherein the video decoder decodes the at least one video stream in accordance with the decoding video frames, when a freeze enable signal is received.

* * * * *